(12) United States Patent
Liu et al.

(10) Patent No.: US 12,511,751 B2
(45) Date of Patent: Dec. 30, 2025

(54) ORAL CAVITY EXAMINATION METHOD, ORAL CAVITY EXAMINATION DEVICE AND COMPUTER-READABLE STORAGE MEDIUM

(71) Applicant: Kenvue Brands LLC, Summit, NJ (US)

(72) Inventors: Fengxing Liu, Shanghai (CN); Erping Yan, Shanghai (CN); Qingbin Wu, Shanghai (CN)

(73) Assignee: Kenvue Brands LLC, Summit, NJ (US)

( * ) Notice: Subject to any disclaimer, the term of this patent is extended or adjusted under 35 U.S.C. 154(b) by 381 days.

(21) Appl. No.: 18/026,982

(22) PCT Filed: Sep. 17, 2021

(86) PCT No.: PCT/CN2021/119036
§ 371 (c)(1),
(2) Date: Mar. 17, 2023

(87) PCT Pub. No.: WO2022/057890
PCT Pub. Date: Mar. 24, 2022

(65) Prior Publication Data
US 2023/0342934 A1     Oct. 26, 2023

(30) Foreign Application Priority Data
Sep. 18, 2020   (CN) ........................ 202010989252.7

(51) Int. Cl.
*G06T 7/90*     (2017.01)
*G06T 7/00*     (2017.01)
(Continued)

(52) U.S. Cl.
CPC ............ *G06T 7/0014* (2013.01); *G06T 7/136* (2017.01); *G06T 7/90* (2017.01); *H04N 9/64* (2013.01);
(Continued)

(58) Field of Classification Search
CPC ......... G06T 7/0014; G06T 7/136; G06T 7/90; G06T 2207/10024; G06T 2207/20032;
(Continued)

(56) References Cited

U.S. PATENT DOCUMENTS

2010/0265356 A1* 10/2010 Takano .................. H04N 1/628
                                                      348/E9.055
2013/0286174 A1* 10/2013 Urakabe .................. A61B 1/04
                                                       348/66
(Continued)

FOREIGN PATENT DOCUMENTS

| | | |
|---|---|---|
| CN | 104346803 A | 2/2015 |
| CN | 110742707 A | 2/2020 |
| CN | 110751635 A | 2/2020 |

OTHER PUBLICATIONS

Supplementary European Search Report issued Aug. 27, 2024 in EP 21868712.7.
(Continued)

*Primary Examiner* — Ali Bayat
(74) *Attorney, Agent, or Firm* — Ice Miller LLP

(57) ABSTRACT

Provided in the present disclosure is an oral cavity examination method, including: acquiring an oral cavity image; performing median filtering and region segmentation operations on the image to obtain a first intermediate image; converting the first intermediate image from an RGB color space to an HSV color space to obtain a second intermediate image; determining a comparison threshold based on a tooth color; and determining a ratio of pixels within the compari-
(Continued)

son threshold to pixels of the second intermediate image based on the second intermediate image and the comparison threshold. The oral cavity examination method can set different comparison thresholds according to tooth colors of subjects, so as to perform targeted examination conforming to the characteristics of different subjects, making the ratio of the pixels within the comparison threshold to the pixels of the second intermediate image determined based on the second intermediate image and the comparison threshold more accurate and effective than the ratio determined by the conventional method, and thus facilitating subsequent evaluation of oral cavity health condition.

27 Claims, 2 Drawing Sheets

(51) Int. Cl.
  *G06T 7/136* (2017.01)
  *H04N 9/64* (2023.01)
  *A61B 1/24* (2006.01)
(52) U.S. Cl.
  CPC ....... *A61B 1/24* (2013.01); *G06T 2207/10024* (2013.01); *G06T 2207/20032* (2013.01); *G06T 2207/30036* (2013.01)

(58) Field of Classification Search
  CPC . G06T 2207/30036; G06T 2207/20012; G06T 7/11; G06T 7/194; G06T 7/0012; H04N 9/64; A61B 1/24; G16H 30/40; G16H 50/30
  USPC .......................................................... 382/128
  See application file for complete search history.

(56) References Cited

U.S. PATENT DOCUMENTS

| | | | |
|---|---|---|---|
| 2016/0125601 A1* | 5/2016 | Wu | H04N 23/56 382/128 |
| 2018/0307024 A1* | 10/2018 | Stoppe | G06T 5/50 |
| 2019/0167115 A1 | 6/2019 | Dorodvand et al. | |
| 2020/0367818 A1* | 11/2020 | DaCosta | A61B 90/30 |
| 2021/0097903 A1* | 4/2021 | Wu | H04N 1/6058 |

OTHER PUBLICATIONS

Eckhard, Timo, et al, "Labial teeth and gingiva color image segmentation for gingival health-state assessment," Conference on Colour in Graphics, Imaging and Vision, vol. 6, Jan. 1, 2012, pp. 102-107.
International Search Report issued Dec. 8, 2021 in PCT/CN2021/119036.
Written Opinion issued Dec. 8, 2021 in PCT/CN2021/119036.

* cited by examiner

ORAL CAVITY EXAMINATION METHOD, ORAL CAVITY EXAMINATION DEVICE AND COMPUTER-READABLE STORAGE MEDIUM

CROSS-REFERENCE TO RELATED APPLICATION

This application is a Section 371 of International Application No. PCT/CN2021/119036 filed Sep. 17, 2021, which was published in the Chinese language Mar. 24, 2022, under International Publication No. WO 2022/057890 A1, which claims priority to Chinese Patent Application No. 202010989252.7 filed Sep. 18, 2020, the disclosures of which are incorporated herein by reference in their entireties.

TECHNICAL FIELD

The present disclosure relates to the field of oral cavity examination, in particular to an oral cavity examination method, an oral cavity examination device, and a computer-readable storage medium for performing the oral cavity examination method.

BACKGROUND OF THE INVENTION

US2019/0167115 A1 has disclosed a system for processing an oral cavity image. The system for processing an oral cavity image includes: an image capturing device; an oral cavity accessory configured to be attached to the image capturing device and mount the image capturing device at a fixed position relative to a mouth of a user; a display and a processing unit, wherein the processing unit is configured to: receive oral cavity image data from the image capturing device; and identify analysis regions corresponding to teeth and gingivae in the image data; extract a set of image attribute features from the analysis regions of the image data; pass the image attribute features through a conditional classifier configured to compare values of the extracted image attribute features with a preset parameter to identify sub-regions of the analysis regions indicating oral cavity health condition; and transmit result data corresponding to the identified sub-regions to the display.

SUMMARY

As described above, the following technical problem exists in the prior art, that is, the existing oral cavity image processing system does not carry out targeted examination conforming to the characteristics of different subjects.

The purpose of the present disclosure is to carry out targeted examination conforming to the characteristics of different subjects. In view of the above technical problem, based on the perspective of the inventor that different subjects have different characteristics, provided in a first aspect of the present disclosure is an oral cavity examination method, including:
  acquiring an oral cavity image;
  performing median filtering, gray-scale image conversion and adaptive threshold segmentation operations on the image to obtain a first intermediate image;
  converting the first intermediate image from an RGB color space to an HSV color space to obtain a second intermediate image;
  determining a comparison threshold based on a tooth color; and
  determining a ratio of pixels within the comparison threshold to pixels of the second intermediate image based on the second intermediate image and the comparison threshold.

The oral cavity examination method according to the present disclosure can set different comparison thresholds according to tooth colors of subjects, so as to perform targeted examination conforming to the characteristics of different subjects, making the ratio of the pixels within the comparison threshold to the pixels of the second intermediate image determined based on the second intermediate image and the comparison threshold more accurate and effective than the ratio determined by the conventional method, and thus facilitating subsequent evaluation of oral cavity health condition.

In an embodiment of the present disclosure, the first intermediate image includes a tooth region in the image, the comparison threshold includes a dental calculus comparison threshold, and the step of determining a ratio of pixels within the comparison threshold to pixels of the second intermediate image based on the second intermediate image and the comparison threshold further includes:
  determining a ratio of pixels within the dental calculus comparison threshold to pixels of the second intermediate image based on the second intermediate image and the dental calculus comparison threshold.

In an embodiment of the present disclosure, the first intermediate image includes a gingiva region in the image, the comparison threshold includes a gingivitis comparison threshold, and the step of determining a ratio of pixels within the comparison threshold to pixels of the second intermediate image based on the second intermediate image and the comparison threshold further includes:
  determining a ratio of pixels within the gingivitis comparison threshold to pixels of the second intermediate image based on the second intermediate image and the gingivitis comparison threshold.

In an embodiment of the present disclosure, the oral cavity examination method further includes adjusting the contrast of the oral cavity image.

In an embodiment of the present disclosure, the tooth color is determined according to the following method:
  acquiring an oral cavity image;
  performing median filtering, gray-scale image conversion and adaptive threshold segmentation operations on the image to obtain a first intermediate image;
  converting the first intermediate image from an RGB color space to an LAB color space to obtain a third intermediate image;
  comparing pixels in the third intermediate image with a standard color; and
  determining the tooth color according to a comparison result.

In an embodiment of the present disclosure, the standard color includes the following six standard color values:
  RGBColor0=sRGBColor(255,255,255);
  RGBColor1=sRGBColor(164,192,239);
  RGBColor2=sRGBColor(131,172,217);
  RGBColor3=sRGBColor(124,149,205);
  RGBColor4=sRGBColor(21,46,110); and
  RGBColor5=sRGBColor(255,255,0).

In an embodiment of the present disclosure, the step of determining the tooth color according to a comparison result further includes:
  determining the tooth color by means of the weighted summation according to the weight of each standard color value.

In an embodiment of the present disclosure, the dental calculus comparison threshold includes at least two groups of threshold intervals each including a high threshold and a low threshold, or the gingivitis comparison threshold includes at least two groups of threshold intervals each including a high threshold and a low threshold.

In an embodiment of the present disclosure, the low threshold is lower than the high threshold, and the low threshold and the high threshold of the gingivitis comparison threshold are selected from the following interval: np.array ([0, 80, 12]) to np.array([40, 235, 210]), or the low threshold and the high threshold of the dental calculus comparison threshold are selected from the following interval: np.array ([0, 30, 10]) to np.array([190, 255, 70]).

In addition, provided in a second aspect of the present disclosure is an oral cavity examination device, including:
- a camera device configured to acquire an oral cavity image;
- an image processing device configured to perform median filtering, gray-scale image conversion and adaptive threshold segmentation operations on the image to obtain a first intermediate image, and convert the first intermediate image from an RGB color space to an HSV color space to obtain a second intermediate image;
- a threshold determination device configured to determine a comparison threshold based on a tooth color; and
- a pixel ratio determination device configured to determine a ratio of pixels within the comparison threshold to pixels of the second intermediate image based on the second intermediate image and the comparison threshold.

In an embodiment of the present disclosure, the first intermediate image includes a tooth region in the image, the comparison threshold includes a dental calculus comparison threshold, and the step of determining a ratio of pixels within the comparison threshold to pixels of the second intermediate image based on the second intermediate image and the comparison threshold further includes:
- determining a ratio of pixels within the dental calculus comparison threshold to pixels of the second intermediate image based on the second intermediate image and the dental calculus comparison threshold.

In an embodiment of the present disclosure, the first intermediate image includes a gingiva region in the image, the comparison threshold includes a gingivitis comparison threshold, and the step of determining a ratio of pixels within the comparison threshold to pixels of the second intermediate image based on the second intermediate image and the comparison threshold further includes:
- determining a ratio of pixels within the gingivitis comparison threshold to pixels of the second intermediate image based on the second intermediate image and the gingivitis comparison threshold.

In an embodiment of the present disclosure, the image processing device is configured to adjust the contrast of the oral cavity image.

In an embodiment of the present disclosure, the tooth color is determined according to the following method:
- acquiring an oral cavity image;
- performing median filtering, gray-scale image conversion and adaptive threshold segmentation operations on the image to obtain a first intermediate image;
- converting the first intermediate image from an RGB color space to an LAB color space to obtain a third intermediate image;
- comparing pixels in the third intermediate image with a standard color; and
- determining the tooth color according to a comparison result.

In an embodiment of the present disclosure, the standard color includes the following six standard color values:
- RGBColor0=sRGBColor(255,255,255);
- RGBColor1=sRGBColor(164,192,239);
- RGBColor2=sRGBColor(131,172,217);
- RGBColor3=sRGBColor(124,149,205);
- RGBColor4=sRGBColor(21,46,110); and
- RGBColor5=sRGBColor(255,255,0).

In an embodiment of the present disclosure, the step of determining the tooth color according to a comparison result further includes:
- determining the tooth color by means of the weighted summation according to the weight of each standard color value.

In an embodiment of the present disclosure, the dental calculus comparison threshold includes at least two groups of threshold intervals each including a high threshold and a low threshold, or the gingivitis comparison threshold includes at least two groups of threshold intervals each including a high threshold and a low threshold.

In an embodiment of the present disclosure, the low threshold is lower than the high threshold, and the low threshold and the high threshold of the gingivitis comparison threshold are selected from the following interval: np.array ([0, 80, 12]) to np.array([40, 235, 210]), or the low threshold and the high threshold of the dental calculus comparison threshold are selected from the following interval: np.array ([0, 30, 10]) to np.array([190, 255, 70]).

Further, provided in a third aspect of the present disclosure is a tangible computer-readable storage medium, including instructions for performing an oral cavity examination method, wherein the instructions, when being executed, cause a processor of a computer to at least:
- acquire an oral cavity image;
- perform median filtering, gray-scale image conversion and adaptive threshold segmentation operations on the image to obtain a first intermediate image;
- convert the first intermediate image from an RGB color space to an HSV color space to obtain a second intermediate image;
- determine a comparison threshold based on a tooth color; and
- determine a ratio of pixels within the comparison threshold to pixels of the second intermediate image based on the second intermediate image and the comparison threshold.

In an embodiment of the present disclosure, the first intermediate image includes a tooth region in the image, the comparison threshold includes a dental calculus comparison threshold, and the step of determining a ratio of pixels within the comparison threshold to pixels of the second intermediate image based on the second intermediate image and the comparison threshold further includes:
- determining a ratio of pixels within the dental calculus comparison threshold to pixels of the second intermediate image based on the second intermediate image and the dental calculus comparison threshold.

In an embodiment of the present disclosure, the first intermediate image includes a gingiva region in the image, the comparison threshold includes a gingivitis comparison threshold, and the step of determining a ratio of pixels within the comparison threshold to pixels of the second intermediate image based on the second intermediate image and the comparison threshold further includes:

determining a ratio of pixels within the gingivitis comparison threshold to pixels of the second intermediate image based on the second intermediate image and the gingivitis comparison threshold.

In an embodiment of the present disclosure, the instructions, when being executed, further cause the processor of the computer to at least adjust the contrast of the oral cavity image.

In an embodiment of the present disclosure, the tooth color is determined according to the following method:

acquiring an oral cavity image;
    performing median filtering, gray-scale image conversion and adaptive threshold segmentation operations on the image to obtain a first intermediate image;
    converting the first intermediate image from an RGB color space to an LAB color space to obtain a third intermediate image;
    comparing pixels in the third intermediate image with a standard color; and
    determining the tooth color according to a comparison result.

In an embodiment of the present disclosure, the standard color includes the following six standard color values:

RGBColor0=sRGBColor(255,255,255);
    RGBColor1=sRGBColor(164,192,239);
    RGBColor2=sRGBColor(131,172,217);
    RGBColor3=sRGBColor(124,149,205);
    RGBColor4=sRGBColor(21,46,110); and
    RGBColor5=sRGBColor(255,255,0).

In an embodiment of the present disclosure, the step of determining the tooth color according to a comparison result further includes:

determining the tooth color by means of the weighted summation according to the weight of each standard color value.

In an embodiment of the present disclosure, the dental calculus comparison threshold includes at least two groups of threshold intervals each including a high threshold and a low threshold, or the gingivitis comparison threshold includes at least two groups of threshold intervals each including a high threshold and a low threshold.

In an embodiment of the present disclosure, the low threshold is lower than the high threshold, and the low threshold and the high threshold of the gingivitis comparison threshold are selected from the following interval: np.array([0, 80, 12]) to np.array([40, 235, 210]), or the low threshold and the high threshold of the dental calculus comparison threshold are selected from the following interval: np.array([0, 30, 10]) to np.array([190, 255, 70]).

To sum up, the oral cavity examination method, the oral cavity examination device and the corresponding computer-readable storage medium provided according to the three aspects of the present disclosure can set different comparison thresholds according to tooth colors of subjects, so as to perform targeted examination conforming to the characteristics of different subjects, making the ratio of the pixels within the comparison threshold to the pixels of the second intermediate image determined based on the second intermediate image and the comparison threshold more accurate and effective than the ratio determined by the conventional method, thus facilitating subsequent evaluation of oral cavity health condition. Other advantages of the present disclosure are further described below.

BRIEF DESCRIPTION OF THE DRAWINGS

With reference to the following detailed description in combination with the accompanying drawings, the features, advantages, and other aspects of the embodiments of the present disclosure become more obvious. Several embodiments of the present disclosure are shown herein by way of example and not limitation. Regarding the accompanying drawings.

DETAILED DESCRIPTION

Figure 1:
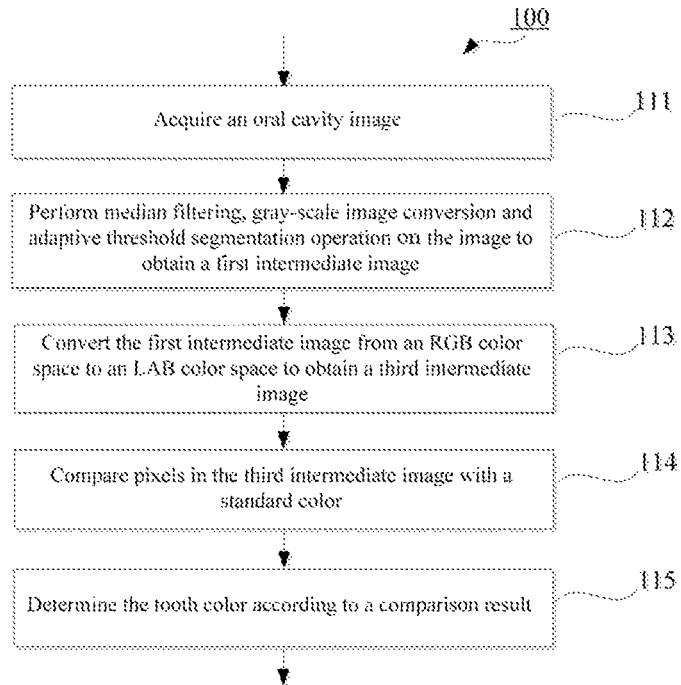
FIG. 1 illustrates a flowchart of an oral cavity examination method 100 according to an embodiment of the present disclosure.

Various exemplary embodiments of the present disclosure are described in detail below with reference to the accompanying drawings. Although the exemplary methods and apparatus described below include software and/or firmware executed on hardware in other components, it should be noted that these examples are merely illustrative and should not be considered limiting. For example, it is contemplated that any or all hardware, software, and firmware components may be implemented exclusively in hardware, exclusively in software, or in any combination of hardware and software. Accordingly, although the exemplary methods and apparatus are described below, it should be readily understood by those skilled in the art that the examples provided are not intended to limit manners for implementing these methods and apparatus.

Moreover, the flowcharts and block diagrams in the accompanying drawings illustrate a system architecture, a function, and an operation that can be possibly implemented by the methods and systems according to various embodiments of the present disclosure. It should be noted that the functions noted in the blocks may also occur in an order different from that noted in the drawings. For example, two blocks represented in succession may actually be substantially executed in parallel, or they may sometimes be executed in the reverse order, depending upon the function involved. It should also be noted that each block of the flowcharts and/or block diagrams, and combinations of blocks in the flowcharts and/or block diagrams, may be implemented using dedicated hardware-based systems that perform the specified functions or operations, or may be implemented using a combination of dedicated hardware and computer instructions.

The term "median filtering" in the present disclosure basically refers to a nonlinear signal processing technology that can effectively suppress noise based on the order statistics theory. The basic principle of median filtering is to replace the value of a point in a digital image or digital sequence with a median value of all points in a neighborhood of the point, so that the surrounding pixel values are close to the real value, thus eliminating isolated noise points. Pixels refer to points constituting an image per unit area, and each pixel may have a different color value. The more pixels per unit area, the higher the resolution, the better the image effect.

The term "adaptive threshold segmentation" in the present disclosure basically refers to an image processing technology. The purpose of image region segmentation is to divide a region of an object from the image, that is, to find out those pixel sets corresponding to the object or object surface, which are expressed as two-dimensional blocks, which is one of the basic shape characteristics of region.

The images appearing in the present disclosure include, but are not limited to, image data obtained after one or more operations such as clipping, contrast adjustment, median filtering, and adaptive threshold segmentation of the original image, which may be either JPEG images in the conventional sense or images in other formats. In other words, they may be other types of pixels after imaging processing, as long as they can meet the technical purpose of the technical solution provided in the present disclosure.

The term "first intermediate image" in the present disclosure basically refers to an intermediate image obtained after performing median filtering, gray-scale image conversion and adaptive threshold segmentation to the oral cavity image, including examination regions where gingivae and teeth are located.

The term "color space" in the present disclosure basically refers to a color model (also known as color space or color system), which is used to describe color in a generally acceptable manner under certain standards. The term "RGB color space" basically refers to the color space based on three basic colors: R (Red), G (Green) and B (Blue). They are superimposed to varying degrees to produce rich and wide colors, so it is commonly known as a three primary color mode. The term "HSV color space" basically refers to the color space proposed for better digital color processing. There are many kinds of HSX color spaces, in which X may be V or I. The meaning of X varies according to the specific use. H represents hue, S represents saturation, V represents value, and I represents intensity. The term "LAB color space" basically refers to three elements, one element is lightness (L), and A and B are two color channels. A includes colors ranging from dark green (low lightness value) to gray (medium lightness value) and then to bright pink (high lightness value); B is from bright blue (low lightness value) to gray (medium lightness value) and then to yellow (high lightness value). Therefore, this color mixing will produce a color with bright effect.

The term "second intermediate image" in the present disclosure basically refers to an intermediate image obtained by converting the first intermediate image from an RGB color space to an HSV color space. Accordingly, the term "third intermediate image" in the present disclosure basically refers to an intermediate image obtained by converting the first intermediate image from an RGB color space to an LAB color space.

The term "standard color" in the present disclosure basically refers to several comparison color values selected from the whole color gamut as standards, which may be, for example, the following six standard colors in the present disclosure: RGBColor0=sRGBColor(255,255,255), RGBColor1=sRGBColor(164,192,239), RGBColor2=sRGBColor(131,172,217), RGBColor3=sRGBColor(124,149,205), RGBColor4=sRGBColor(21,46,110) and RGBColor5=sRGBColor(255,255,0). Of course, those skilled in the art should understand that such a selection is only exemplary rather than restrictive.

The term "comparison threshold" in the present disclosure basically refers to including at least two groups of threshold intervals each including a high threshold and a low threshold, wherein the low threshold is lower than the high threshold, and the low threshold and the high threshold are selected from the following interval: np.array([0, 80, 12]) to np.array([40, 235, 210]) or np.array([0, 30, 10]) to np.array([190, 255, 70]). Specifically, the low threshold and the high threshold of the gingivitis comparison threshold are selected from the following interval: np.array([0, 80, 12]) to np.array([40, 235, 210]), or the low threshold and the high threshold of the dental calculus comparison threshold are selected from the following interval: np.array([0, 30, 10]) to np.array([190, 255, 70]).

Before introducing the oral cavity examination method provided by the present disclosure, the applicant of the present disclosure wishes to first introduce the hardware model selection design of the oral cavity examination device disclosed in the present disclosure, but the following description is only exemplary rather than restrictive. As long as the purpose of the design can be realized, other selection is also feasible. In other words, other models will also fall within the scope of protection claimed in the claims of the present disclosure.

In terms of hardware, through the following specially designed structure, high-quality oral cavity photos such as white light non-ultraviolet photos and ultraviolet photos can be photographed. Here, ultraviolet photos are not necessary, but optional. For example, a camera module may be an 8 million high-definition autofocus module, model KS8A17, the module size is 38 mm*38 mm, the working temperature is −20° C. to 70° C., and the imaging distance is 3 cm to infinity. This module can take photos with resolution of 3264*2448 and has excellent response ability in a low illumination environment, and the photos can be transmitted to a controller for processing at high speed. For example, an ultraviolet module may be a UV lamp structure, which has a simple shape and includes a UV lamp electrode, a built-in UV lamp bead (with central wavelength of 365 nm, for example), a conical structure (which can realize the focusing function) and a UV filter (which can filter out the interference light and only transmit the UV light). When being powered, this module can be used as a UV light source in the process of acquiring an oral cavity image. As for the arrangement of UV lamps, for example, the UV lamp part may consist of two UV lamps, which are respectively located on the left and right sides of the camera, and the distance to the camera is between 1 cm and 3 cm.

In addition, the non-ultraviolet module may be a white LED lamp structure, for example, which uses a 3 mm LED white light emitting diode. As for the arrangement of LED lamps, for example, the LED lamp part may consist of four white LED lamps, which are respectively located at the four corners inside an oral cavity examination device, and are arranged in a rectangular shape around the camera, and the distance to the camera is between 1 cm and 5 cm.

In addition, a power module being used can be a UV lamp power supply module, which can supply power to the two UV lamps respectively through two AA batteries both having a voltage of 1.5V. The batteries are connected to the UV lamps through a relay for the purpose of control. In addition, the power module may also include a module that supplies power to the controller. A 5V 1500 mAh lithium battery can be used as a power supply for the whole unit, and all structures except the UV lamps may be powered thereby.

In terms of algorithm, based on the high-quality oral cavity photos acquired by hardware, for example, non-ultraviolet photos such as white light photos and ultraviolet photos, the following oral cavity problem analysis is performed.

Firstly, the process of tooth color analysis and corresponding scoring is introduced. In this process, based on an oral cavity image, for example, a non-ultraviolet photo such as a pure white light image, an original RGB color space is converted into an LAB color space through median filtering, gray-scale image conversion and adaptive threshold segmentation; then a comparison with standard colors is performed; for example, six standard colors are respectively RGBColor0=sRGBColor (255,255,255), RGBColor1=sRGBColor (164,192,239), RGBColor2=sRGBColor (131,172,217), RGBColor3=sRGBColor (124,149,205), RGBColor4=sRGBColor (21,46,110) and RGBColor5=sRGBColor (255,255,0); finally, different colors have different weighting factors in scores, and weighted summation is performed to finally obtain a tooth color score of the subject. For example, 10000 pixels are obtained from a pure white light photo, and then the pixel values of these 10000 pixels are compared with the above six standard colors, that is, these 10000 pixels are classified according to the standard colors to which the pixels are close, the number of pixels is counted for each standard color to which the pixels are close, and then weighted averaging is performed to finally obtain the tooth color score of the subject.

This is a technical solution for obtaining the value of tooth color through the image processing technology. However, the tooth color does not have to be determined in the above way, but may also be determined qualitatively. For example, the tooth color is divided into different levels (such as black, very yellow, yellow, white, and very white), and each level corresponds to a comparison threshold. Then, for example, the subject may select their own tooth color in the qualitative evaluation, and the comparison threshold may be determined correspondingly according to the selection of the subject.

In the technical solution for quantitatively determining the tooth color, FIG. 1 illustrates a flowchart of an oral cavity examination method 100 according to an embodiment of the present disclosure. From FIG. 1, it can be seen that the tooth color in the oral cavity examination method 100 is determined through the following method: firstly, in method step 111, acquiring an oral cavity image; then, in method step 112, performing median filtering, gray-scale image conversion and adaptive threshold segmentation operations on the image to obtain a first intermediate image; next, in method step 113, converting the first intermediate image from an RGB color space to an LAB color space to obtain a third intermediate image; then, in method step 114, comparing pixels in the third intermediate image with a standard color; and finally, in method step 115, determining the tooth color according to a comparison result. According to an embodiment of the present disclosure, the standard color includes the following six standard color values: RGBColor0=sRGBColor (255,255,255), RGBColor1=sRGBColor (164,192,239), RGBColor2=sRGBColor (131,172,217), RGBColor3=sRGBColor (124,149,205), RGBColor4=sRGBColor (21,46,110) and RGBColor5=sRGBColor (255,255,0). According to an embodiment of the present disclosure, the step of determining the tooth color according to a comparison result further includes determining the tooth color by means of the weighted summation according to the weight of each standard color value.

That is, after obtaining the oral cavity image, for example, a non-ultraviolet oral image such as pure white light image, a median filtering operation is performed on the non-ultraviolet image to eliminate noise points. For example, if a 3*3 pixel matrix is taken in the image, that is, there are nine pixels in the pixel matrix, the nine pixels are ordered, and finally a center point of this matrix is assigned as a median of the nine pixels. This operation is called median filtering operation. Then it is converted into a gray-scale image. The specific conversion method is to perform an operation r*0.2126+g*0.7152+b*0.0722 to each pixel in three channel images of three RGB colors. The gray-scale image can be obtained by superimposing the three channel images according to the ratios. Next, the adaptive threshold adjustment and region segmentation are performed to segment regions of interest. Specifically, on the basis of the gray-scale image, the actual value of each pixel is distributed in [0, 255], and then it is necessary to further determine which pixels are the foreground and which pixels are the background. Here, the adaptive threshold adjustment is to traverse from 0 to 255, determine whether a pixel value is a pixel of the foreground class or a pixel of the background class, maximize a correlation coefficient between the class of the foreground class pixels and the class of the background class pixels, so as to obtain an adaptive threshold, and then use the adaptive threshold to distinguish the pixels of the foreground and background and perform a region segmentation operation to obtain the regions of interest, which are only a tooth region and a gingiva region here. Optionally, the step of determining a first region including the tooth region and the gingiva region based on the non-ultraviolet image may further include adjusting the contrast of the non-ultraviolet image to enhance the contrast. In short, for example, the original image and a black image may be used, the pixels may be superimposed according to the ratios to form a new image, and a difference between the foreground and background pixel values of the new image will become larger, that is, the image contrast is enhanced, thus facilitating the subsequent adaptive threshold segmentation operation.

The tooth color of the subject can be determined through the method illustrated in FIG. 1, and then targeted oral cavity examination may be performed on each subject according to different tooth colors. Of course, the tooth color of the subject may not be determined at each time of oral cavity examination. For example, the subject may input his own tooth color into a relevant apparatus or instrument. Moreover, the non-ultraviolet oral cavity image here does not have to be taken in real time by the camera, but may also be downloaded from a network via a communication interface, extracted from other images, or obtained through preprocessing.

Figure 2:
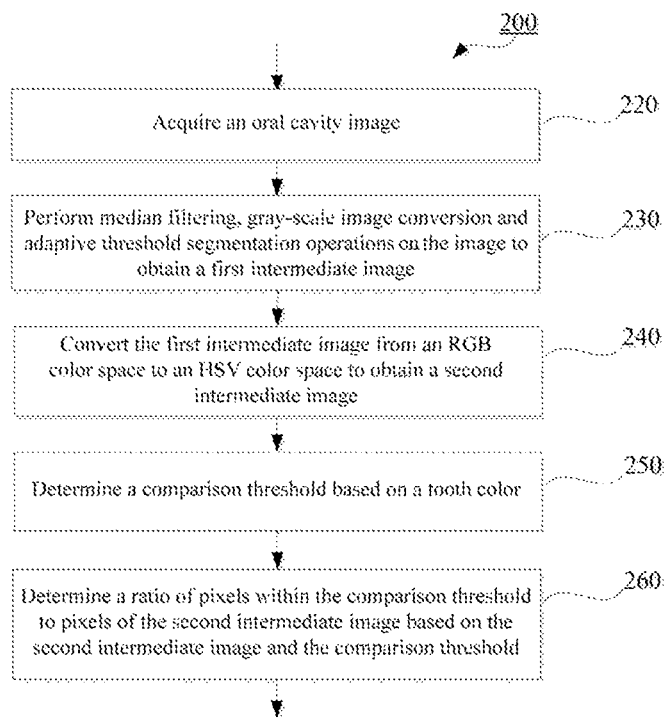
FIG. 2 illustrates a flowchart of an oral cavity examination method 200 according to another embodiment of the present disclosure.

After determining the tooth color, FIG. 2 illustrates a flowchart of an oral cavity examination method 200 according to an embodiment of the present disclosure. From FIG. 2, it can be seen that the oral cavity examination method 200 according to the present disclosure illustrated in FIG. 2 includes at least the following steps: firstly, in method step 220, acquiring an oral cavity image, wherein the oral cavity image acquired here may be either the oral cavity image used to determine the tooth color previously or other oral cavity images, and similarly, the non-ultraviolet oral cavity image here does not have to be taken in real time by the camera, but may also be downloaded from the network through the communication interface, extracted from other images or obtained after preprocessing; then, in method step 230, performing median filtering, gray-scale conversion and adaptive threshold segmentation operations on the image to obtain a first intermediate image; next, in method step 240, converting the first intermediate image from an RGB color space to an HSV color space to obtain a second intermediate image; next, in method step 250, determining a comparison threshold based on the tooth color; and finally, in method step 260, determining a ratio of pixels within the comparison threshold to pixels of the second intermediate image based on the second intermediate image and the comparison threshold. Here, those skilled in the art should understand that the sequence of performing the steps of the method here does not have to be as shown in FIG. 2. For example, the comparison threshold may be determined according to the tooth color of the subject, and then the oral cavity image is acquired and processed. Those skilled in the art should understand that the median filtering, gray-scale image conversion and adaptive threshold segmentation operations performed here are similar to the technical means previously used in determining the tooth color. In order to save space, they will not be repetitively described here.

Specifically, the oral cavity examination method can be used, for example, to determine the evaluation of the gingiva condition of the subject. In this case, the oral cavity examination method is used for gingivitis examination and scoring. In this process, based on the oral cavity image, such as pure white light image, optionally the contrast of the image may be adjusted firstly, and then median filtering, gray-scale image conversion and adaptive threshold segmentation operations are performed successively. For the process of determining tooth inflammation, the gingivae are mainly checked. Therefore, after adaptive threshold segmentation and clipping, the tooth region is removed to obtain an examination image. It is also necessary to convert the examination image from the original RGB color space to the HSV color space, then adjust the threshold constraint, and thus determine the pixels within the threshold as a gingiva infection region, and finally obtain a final score according to the ratio of the pixels of the infection region to the pixels of the entire region. To sum up, in this case, the first intermediate image in the oral cavity examination method 200 includes a gingiva region in the image, the comparison threshold includes a gingivitis comparison threshold, and method step 260, that is, the step of determining a ratio of pixels within the comparison threshold to pixels of the second intermediate image based on the second intermediate image and the comparison threshold further includes determining a ratio of pixels within the gingivitis comparison threshold to pixels of the second intermediate image based on the second intermediate image and the gingivitis comparison threshold.

For example, firstly an oral cavity image such as a pure white light image is input, and then optionally the contrast of the image is adjusted. Two parameters required here are alpha=0.7 and beta=20, respectively. The original image is mixed and superimposed with an all black image of the same size to reduce the pixel value of the original image. Then median filtering is performed on the image to remove noise pixels. Then the image is converted into a gray-scale image, and an examination region is obtained by adaptive threshold segmentation. Then, the original RGB color space image is converted to an HSV color space image, and a suspected gingivitis threshold is set. In an embodiment of the present disclosure, the comparison threshold includes at least two groups of threshold intervals each including a high threshold and a low threshold. In an embodiment of the present disclosure, the low threshold is lower than the high threshold, and the low threshold and the high threshold are selected from the following interval: np.array([0, 80, 12]) to np.array([40, 235, 210]).

Here, for example, there are three interval ranges. In each interval range, the low threshold is lower than the high threshold, and the low threshold and the high threshold are selected from the following intervals: np.array([0, 80, 12]) to np.array([40, 235, 210]) or np.array([0, 30, 10]) to np.array([190, 255, 70]), wherein the interval of np.array([0, 80, 12]) to np.array([40, 235, 210]) is mainly used to select the gingivitis comparison threshold, and the interval of np.array ([0, 30, 10]) to np.array ([190, 255, 70]) is mainly used to select the dental calculus comparison threshold.

Specifically, for example, the low threshold is np.array ([0,170,60]) and the high threshold is np.array([10,215,70]); or the lower threshold is np.array([0,170,35]) and the high threshold is np.array([10,225,50]); or the lower threshold is np.array([20,130,130]) and the high threshold is np.array ([26,200,200]). For example, when the teeth of the subject are yellow, for example, when the previous tooth color score is less than 60 points, the comparison threshold including the low threshold of np.array([20,130,130]) and the high threshold of np.array([26,200,200]) is selected; when the teeth of the subject are white, for example, when the previous tooth color score is more than 60 and less than 80, the comparison threshold including the low threshold of np.array([0,170, 35]) and the high threshold of np.array([10,225,50]) is selected; when the teeth of the subject are very white, for example, when the previous tooth color score is more than 80 points, the comparison threshold with the low threshold of np.array([0,170,60]) and the high threshold of np.array ([10,215,70]) is selected.

Here, the selection of the high threshold and the low threshold is only exemplary rather than restrictive, and those skilled in the art may also select other values within the above range.

Specifically, when oral cavity examination is performed on each subject, the dynamic selection or setting of the comparison threshold will be carried out according to the tooth color of the subject, and then the pixels higher than the low threshold and lower than the high threshold are set to 0. The pixels between the thresholds are a suspected gingivitis region, the gingivitis pixels are counted, and a ratio of the gingivitis pixels to the total pixels of the examination region is calculated, and finally the gingivitis examination score is 10–99.9*10*ratio.

In addition, for example, the oral cavity examination method may also be used to determine the evaluation of the dental calculus of the subject. In this case, the oral cavity examination method is used to examine the dental calculus condition of the subject. In this process, the first intermediate image includes a tooth region in the image, the comparison threshold includes a dental calculus comparison threshold, and method step 260, that is, the step of determining a ratio of pixels within the comparison threshold to pixels of the second intermediate image based on the second intermediate image and the comparison threshold further includes determining a ratio of pixels within the dental calculus comparison threshold to pixels of the second intermediate image based on the second intermediate image and the dental calculus comparison threshold. In other words, in this case, the oral cavity examination method according to the present disclosure optionally adjusts the contrast of the image based on the oral cavity image, such as pure white light image, and performs median filtering; then, performs gray-scale image conversion and adaptive threshold segmentation such as examination region clipping to obtain an examination part image, and then converts it from an RGB color space to an HSV color space; then sets a threshold, removes non-examination parts to obtain dental calculus pixels, and determines a ratio of these obtained pixels to the total pixels of the examination region to obtain a dental calculus examination score.

For example, firstly an oral cavity image such as a pure white light image is input, and then preferably the contrast of the image is adjusted. Two parameters required here are alpha=0.5 and beta=−30, respectively. The original image is mixed and superimposed with an all black image of the same size to reduce the pixel value of the original image. Then median filtering is performed on the image to remove noise pixels. Then the image is converted into a gray-scale image, and region segmentation is performed through adaptive threshold segmentation to obtain an examination region. Then, the original RGB color space image is converted to an HSV color space image, a suspected dental calculus threshold is set, respectively the low threshold is set to, for example, np.array([18, 90, 22]) and the high threshold is set to, for example, np.array([30, 225, 60]), then the pixels higher than the low threshold and lower than the high threshold are set to 0, the pixels between the thresholds are a suspected dental calculus region, the dental calculus pixels are counted, then a ratio of the dental calculus pixels to the total pixels of the examination region is calculated, and finally a dental calculus examination score is 10−99.9*10*ratio. Here, the selection of the low threshold and the high threshold is only exemplary rather than restrictive. Of course, those skilled in the art may also select other thresholds according to the tooth color of the subject.

As described above, the dental calculus comparison threshold may be determined according to the tooth color. For example, when the teeth of the subject are yellow, for example, when the previous tooth color score is less than 60 points, the comparison threshold including the low threshold of np.array([150,50,18]) and the high threshold of np.array([180,130,30]) is selected; when the teeth of the subject are white, for example, when the previous tooth color score is more than 60 and less than 80, the comparison threshold including the low threshold of np.array([2,240,10]) and the high threshold of np.array([20,255,25]) is selected; when the teeth of the subject are very white, for example, when the previous tooth color score is more than 80 points, the comparison threshold with the low threshold of np.array([18,90,22]) and the high threshold of np.array([30,225,60]) is selected.

The above embodiment of dynamically determining the gingivitis comparison threshold and the dental calculus comparison threshold according to the tooth color is only an example, which does not limit the scope of protection of the claims of the present disclosure, and those skilled in the art should understand that, in specific implementation, for example, the gingivitis comparison threshold and the dental calculus comparison threshold may also be dynamically determined according to the gingiva color. In other words, in the above examination dimensions, the examination of one or more dimensions may be superimposed. For example, the result of tooth or gingiva color may be used as a basic parameter of other examination dimensions to obtain an adaptive algorithm based on the tooth color, thus making the examination of other dimensions such as dental calculus more accurate. In other words, the oral cavity examination method according to the present disclosure can set different comparison thresholds according to tooth colors or gingiva colors of subjects, so as to perform targeted examination conforming to the characteristics of different subjects, making the ratio of the pixels within the comparison threshold to the pixels of the second intermediate image determined based on the second intermediate image and the comparison threshold more accurate and effective than the ratio determined by the conventional method, and thus facilitating subsequent evaluation of oral cavity health condition.

Figure 3:
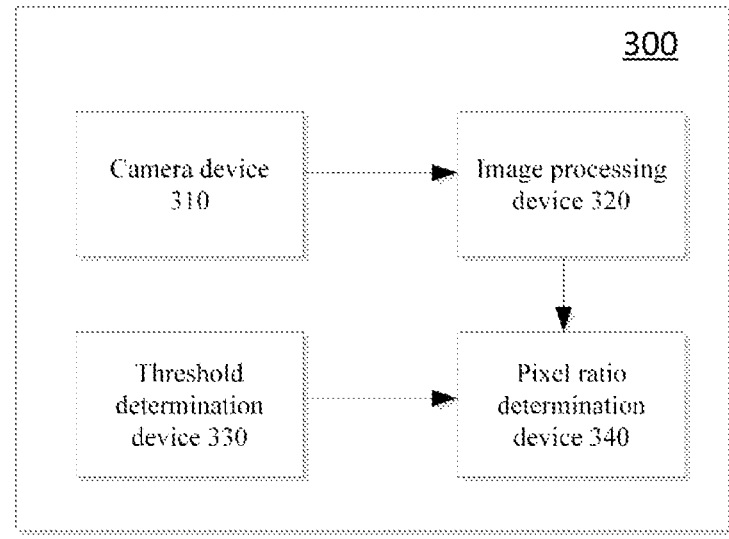
FIG. 3 illustrates a schematic block diagram of an oral cavity examination device 300 according to an embodiment of the present disclosure.

FIG. 3 illustrates an oral cavity examination device 300 provided by the present disclosure. The oral cavity examination device 300 includes: a camera device 310 configured to acquire an oral cavity image; an image processing device 320 configured to perform median filtering, gray-scale image conversion and adaptive threshold segmentation operations on the image to obtain a first intermediate image, and convert the first intermediate image from an RGB color space to an HSV color space to obtain a second intermediate image; a threshold determination device 430 configured to determine a comparison threshold based on a tooth color; and a pixel ratio determination device 440 configured to determine a ratio of pixels within the comparison threshold to pixels of the second intermediate image based on the second intermediate image and the comparison threshold.

According to an embodiment of the present disclosure, the first intermediate image includes a tooth region in the image, the comparison threshold includes a dental calculus comparison threshold, and the step of determining a ratio of pixels within the comparison threshold to pixels of the second intermediate image based on the second intermediate image and the comparison threshold further includes determining a ratio of pixels within the dental calculus comparison threshold to pixels of the second intermediate image based on the second intermediate image and the dental calculus comparison threshold.

According to an embodiment of the present disclosure, the first intermediate includes a gingiva region in the image, the comparison threshold includes a gingivitis comparison threshold, and the step of determining a ratio of pixels within the comparison threshold to pixels of the second intermediate image based on the second intermediate image and the comparison threshold further includes determining a ratio of pixels within the gingivitis comparison threshold to pixels of the second intermediate image based on the second intermediate image and the gingivitis comparison threshold.

According to an embodiment of the present disclosure, the tooth color is determined according to the following method: acquiring an oral cavity image; performing median filtering, gray-scale image conversion and adaptive threshold segmentation operations on the image to obtain a first intermediate image; converting the first intermediate image from an RGB color space to an LAB color space to obtain a third intermediate image; comparing pixels in the third intermediate image with a standard color; and determining the tooth color according to a comparison result.

According to an embodiment of the present disclosure, the standard color includes the following six standard color values: RGBColor0=sRGBColor(255,255,255); RGBColor1=sRGBColor(164,192,239); RGBColor2=sRGBColor(131,172,217); RGBColor3=sRGBColor(124,149,205); RGBColor4=sRGBColor(21,46,110); and RGBColor5=sRGBColor(255,255,0).

According to an embodiment of the present disclosure, the step of determining the tooth color according to a comparison result further includes determining the tooth color by means of the weighted summation according to the weight of each standard color value.

In an embodiment of the present disclosure, the dental calculus comparison threshold includes at least two groups of threshold intervals each including a high threshold and a low threshold, or the gingivitis comparison threshold includes at least two groups of threshold intervals each including a high threshold and a low threshold.

In an embodiment of the present disclosure, the low threshold is lower than the high threshold, and the low threshold and the high threshold of the gingivitis comparison threshold are selected from the following interval: np.array ([0, 80, 12]) to np.array([40, 235, 210]), or the low threshold and the high threshold of the dental calculus comparison threshold are selected from the following interval: np.array ([0, 30, 10]) to np.array([190, 255, 70]).

Further, provided in an embodiment of the present disclosure further is a tangible computer-readable storage medium, including instructions for performing an oral cavity examination method, wherein the instructions, when being executed, cause a processor of a computer to at least:
- acquire an oral cavity image;
- perform median filtering, gray-scale image conversion and adaptive threshold segmentation operations on the image to obtain a first intermediate image;
- convert the first intermediate image from an RGB color space to an HSV color space to obtain a second intermediate image;
- determining a comparison threshold based on a tooth color; and
- determine a ratio of pixels within the comparison threshold to pixels of the second intermediate image based on the second intermediate image and the comparison threshold.

In an embodiment of the present disclosure, the first intermediate image includes a tooth region in the image, the comparison threshold includes a dental calculus comparison threshold, and the step of determining a ratio of pixels within the comparison threshold to pixels of the second intermediate image based on the second intermediate image and the comparison threshold further includes:
- determining a ratio of pixels within the dental calculus comparison threshold to pixels of the second intermediate image based on the second intermediate image and the dental calculus comparison threshold.

In an embodiment of the present disclosure, the first intermediate image includes a gingiva region in the image, the comparison threshold includes a gingivitis comparison threshold, and the step of determining a ratio of pixels within the comparison threshold to pixels of the second intermediate image based on the second intermediate image and the comparison threshold further includes:
- determining a ratio of pixels within the gingivitis comparison threshold to pixels of the second intermediate image based on the second intermediate image and the gingivitis comparison threshold.

In an embodiment of the present disclosure, the tooth color is determined according to the following method:
- acquiring an oral cavity image;
- performing median filtering, gray-scale image conversion and adaptive threshold segmentation operations on the image to obtain a first intermediate image;
- converting the first intermediate image from an RGB color space to an LAB color space to obtain a third intermediate image;
- comparing pixels in the third intermediate image with a standard color; and
- determining the tooth color according to a comparison result.

In an embodiment of the present disclosure, the standard color includes the following six standard color values:
- RGBColor0=sRGBColor(255,255,255);
- RGBColor1=sRGBColor(164,192,239);
- RGBColor2=sRGBColor(131,172,217);
- RGBColor3=sRGBColor(124,149,205);
- RGBColor4=sRGBColor(21,46,110); and
- RGBColor5=sRGBColor(255,255,0).

In an embodiment of the present disclosure, the step of determining the tooth color according to a comparison result further includes:
- determining the tooth color by means of the weighted summation according to the weight of each standard color value.

In an embodiment of the present disclosure, the dental calculus comparison threshold includes at least two groups of threshold intervals each including a high threshold and a low threshold, or the gingivitis comparison threshold includes at least two groups of threshold intervals each including a high threshold and a low threshold.

In an embodiment of the present disclosure, the low threshold is lower than the high threshold, and the low threshold and the high threshold of the gingivitis comparison threshold are selected from the following interval: np.array ([0, 80, 12]) to np.array([40, 235, 210]), or the low threshold and the high threshold of the dental calculus comparison threshold are selected from the following interval: np.array ([0, 30, 10]) to np.array([190, 255, 70]).

To sum up, the oral cavity examination method, the oral cavity examination device and the corresponding computer-readable storage medium provided according to the embodiments of the present disclosure can set different comparison thresholds according to tooth colors of subjects, so as to perform targeted examination conforming to the characteristics of different subjects, making the ratio of the pixels within the comparison threshold to the pixels of the second intermediate image determined based on the second intermediate image and the comparison threshold more accurate and effective than the ratio determined according to the conventional method, and thus facilitating subsequent evaluation of oral cavity health condition. Other advantages of the present disclosure are further described below.

In addition, alternatively, the method described above may be implemented by a computer program product, i.e., a computer-readable storage medium. The computer program product may include a computer-readable storage medium, carrying computer-readable program instructions thereon for performing various aspects of the present disclosure. The computer-readable storage medium may be a tangible device that can hold and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination of the foregoing. More specific examples (the list of which is not exhaustive) of the computer-readable storage medium include: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical coding device, a punched card or protruding structure in a groove, for example, having instructions stored thereon, and any suitable combination of the foregoing. The computer-readable storage medium used herein is not to be construed as an instantaneous signal per se, such as a radio wave or another freely propagating electromagnetic wave, an electromagnetic wave propagating through a waveguide or other transmission medium (e.g., a light pulse passing through a fiber optic cable), or an electrical signal transmitted through a wire.

Figure 4:
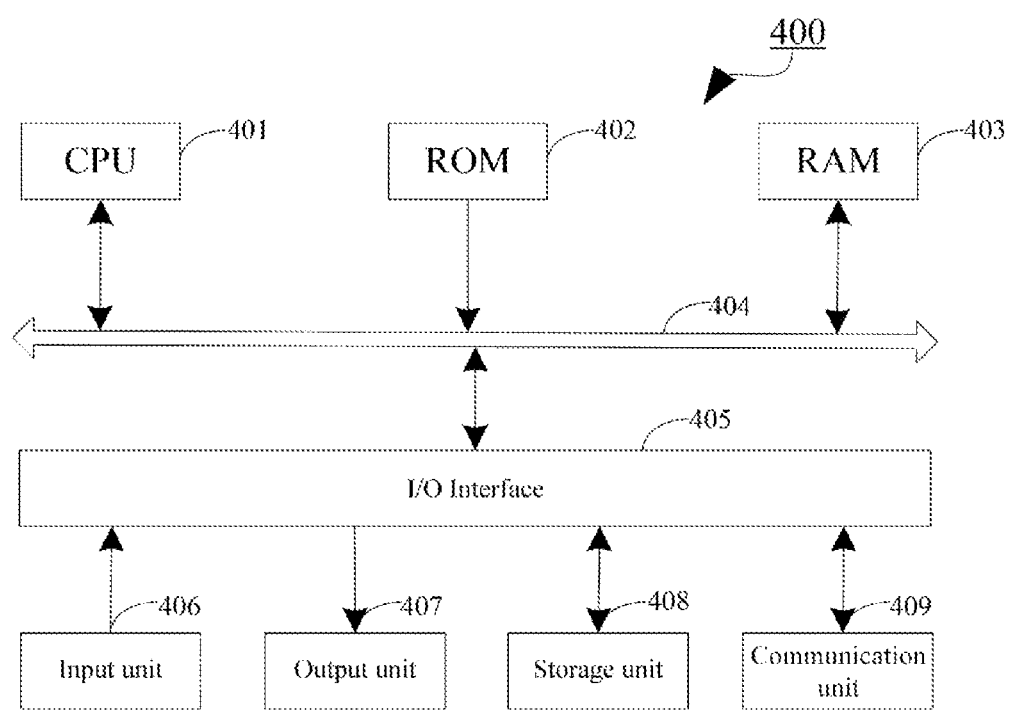
FIG. 4 illustrates a schematic block diagram of an oral cavity examination device 400 according to another embodiment of the present disclosure.

FIG. 4 illustrates a schematic block diagram of an oral cavity examination device 400 according to an embodiment of the present disclosure. It should be understood that the oral cavity examination device 400 may be implemented to have the function of implementing the oral cavity examination method 100 in FIG. 1 or the oral cavity examination method 200 in FIG. 2. From FIG. 4, it can be seen that the oral cavity examination device 400 includes a Central Processing Unit (CPU) 401 (for example, a processor), which can execute various appropriate actions and processes according to the computer program instructions stored in a Read-Only Memory (ROM) 402 or the computer program instructions loaded from a storage unit 408 into a Random Access Memory (RAM) 403. In the RAM 403, various programs and data required for the operations of the oral cavity examination device 400 may also be stored. The CPU 401, ROM 402, and RAM 403 are connected to each other by a bus 404. An input/output (I/O) interface 405 is also connected to the bus 404.

A plurality of components in the oral cavity examination device 400 are connected to an I/O interface 405, including an input unit 406, such as a keyboard or a mouse; an output unit 407, such as various types of displays or speakers; a storage unit 408, such as a magnetic disk or an optical disk; and a communication unit 409, such as a network card, a modem or a wireless communication transceiver. The communication unit 409 allows the apparatus 400 to exchange information/data with other devices over a computer network, for example the Internet, and/or various telecommunications networks.

To sum up, provided in a third aspect of the present disclosure is a tangible computer-readable storage medium, including instructions for performing an oral cavity examination method, wherein the instructions, when being executed, cause a processor of a computer to at least perform the oral cavity examination method 100 in FIG. 1 or the oral cavity examination method 200 in FIG. 2.

The various methods described above, such as the oral cavity examination method 100 or the oral cavity examination method 200, may be executed by the central processing unit 401. For example, in some embodiments, the oral cavity examination method 100 or the oral cavity examination method 200 may be implemented as a computer software program tangibly contained in a machine-readable medium, such as the storage unit 408. In some embodiments, part or all of the computer program may be loaded and/or installed on the oral cavity examination device 400 via the ROM 402 and/or the communication unit 409. When the computer program is loaded into the RAM 403 and executed by the CPU 401, one or more actions or steps in the oral cavity examination method 100 or the oral cavity examination method 200 described above may be performed.

Generally speaking, various example embodiments of the present disclosure may be implemented in hardware or dedicated circuitry, software, firmware, logic, or any combination thereof. Some aspects may be implemented in hardware, while other aspects may be implemented in firmware or software that may be executed by a controller, a microprocessor, or other computing devices. While aspects of embodiments of the present disclosure are illustrated or described as block diagrams, flowcharts, or represented using some other graphical representations, it will be understood that the blocks, apparatuses, systems, techniques, or methods described herein may be implemented as non-limiting examples in hardware, software, firmware, dedicated circuits or logic, general-purpose hardware or controllers, or other computing devices, or some combination thereof.

Although it has been described above that various example embodiments of the present disclosure can be implemented in hardware or dedicated circuits, the aforementioned data processing device for the block chain can be implemented in the form of hardware or software. This is because: in the 1990s, a technical improvement can easily be a hardware improvement (for example, an improvement in circuit structures such as diodes, transistors, and switches) or a software improvement (for example, an improvement in method flows). However, with continued development of technology, many improvements in method flows today can almost be achieved by programming an improved method flow into a hardware circuit. In other words, a corresponding hardware circuit structure is obtained by programming different programs for the hardware circuit, that is, the hardware circuit structure is changed. Therefore, such improvements in method flows can also be regarded as direct improvements in the hardware circuit structure. Therefore, it cannot be said that an improvement in a method flow cannot be implemented by a hardware entity module. For example, a programmable logic device (PLD) (such as a field programmable gate array (FPGA)) is an integrated circuit whose logic function is determined by programming the device by a user. The designer performs programming by himself to "integrate" a digital system on a piece of programmable logic device, without the need for a dedicated integrated circuit chip designed and manufactured by a chip manufacturer. Also, instead of making an integrated circuit chip manually, this programming is also implemented with "logic compiler" software similar to the software compiler used in program development writing, while the raw code to be compiled has to be written in a particular programming language, referred to as the Hardware Description Language (HDL), and HDL also does not have only one kind, but rather multiple kinds, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., The Very-High-Speed Integrated Circuit Hardware Description Language (VHDL) and Verilog are currently most commonly used. It should also be clear to those skilled in the art that the hardware circuit for implementing the logic method flow can be easily obtained by only slightly logically programming a method flow using the above several hardware description languages and programming the method flow into an integrated circuit.

Computer-readable program instructions or computer program products for executing various aspects of the present disclosure can also be stored in the cloud. When invoking is required, a user can access the computer-readable program instructions stored on the cloud for executing an aspect of the present disclosure via a mobile Internet, a solid network, or other networks, thereby implementing the technical solutions disclosed according to various aspects of the present disclosure.

To sum up, the oral cavity examination method, the oral cavity examination device and the corresponding computer-readable storage medium provided according to the three aspects of the present disclosure can set different comparison thresholds according to tooth colors of subjects, so as to perform targeted examination conforming to the characteristics of different subjects, making the ratio of the pixels within the comparison threshold to the pixels of the second intermediate image determined based on the second intermediate image and the comparison threshold more accurate and effective than the ratio determined by the conventional method, and thus facilitating subsequent evaluation of oral cavity health condition.

The above descriptions are merely optional embodiments of the present disclosure, and are not intended to limit the embodiments of the present disclosure. For those skilled in the art, the embodiments of the present disclosure may have various changes and modifications. Any modifications, equivalent substitutions, improvements, etc. made within the spirit and principle of the embodiments of the present disclosure shall fall within the protection scope of the embodiments of the present disclosure.

While embodiments of the present disclosure have been described with reference to several specific embodiments, it should be understood that embodiments of the disclosure are not limited to the specific embodiments disclosed. Embodiments of the present disclosure are intended to cover various modifications and equivalent arrangements included within the spirit and scope of the appended claims. The scope of the claims is accorded the broadest interpretation, thereby including all such modifications as well as equivalent structures and functions.

The invention claimed is:

1. An oral cavity examination method, characterized by comprising:
    acquiring an oral cavity image;
    performing median filtering, gray-scale image conversion and adaptive threshold segmentation operations on the image to obtain a first intermediate image;
    converting the first intermediate image from an RGB color space to an HSV color space to obtain a second intermediate image;
    determining a comparison threshold based on a tooth color; and
    determining a ratio of pixels within the comparison threshold to pixels of the second intermediate image based on the second intermediate image and the comparison threshold.

2. The oral cavity examination method according to claim 1, wherein the first intermediate image comprises a tooth region in the image, the comparison threshold comprises a dental calculus comparison threshold, and the step of determining a ratio of pixels within the comparison threshold to pixels of the second intermediate image based on the second intermediate image and the comparison threshold further comprises:
    determining a ratio of pixels within the dental calculus comparison threshold to pixels of the second intermediate image based on the second intermediate image and the dental calculus comparison threshold.

3. The oral cavity examination method according to claim 1, wherein the first intermediate image comprises a gingiva region in the image, the comparison threshold comprises a gingivitis comparison threshold, and the step of determining a ratio of pixels within the comparison threshold to pixels of the second intermediate image based on the second intermediate image and the comparison threshold further comprises:
    determining a ratio of pixels within the gingivitis comparison threshold to pixels of the second intermediate image based on the second intermediate image and the gingivitis comparison threshold.

4. The oral cavity examination method according to claim 1, wherein the oral cavity examination method further comprises:
    adjusting the contrast of the oral cavity image.

5. The oral cavity examination method according to claim 1, wherein the tooth color is determined according to the following method:
    acquiring an oral cavity image;
    performing median filtering, gray-scale image conversion and adaptive threshold segmentation operations on the image to obtain a first intermediate image;
    converting the first intermediate image from an RGB color space to an LAB color space to obtain a third intermediate image;
    comparing pixels in the third intermediate image with a standard color; and
    determining the tooth color according to a comparison result.

6. The oral cavity examination method according to claim 5, wherein the standard color comprises the following six standard color values:
    RGBColor0=sRGBColor(255,255,255);
    RGBColor1=sRGBColor(164,192,239);
    RGBColor2=sRGBColor(131,172,217);
    RGBColor3=sRGBColor(124,149,205);
    RGBColor4=sRGBColor(21,46,110); and
    RGBColor5=sRGBColor(255,255,0).

7. The oral cavity examination method according to claim 6, wherein the step of determining the tooth color according to a comparison result further comprises:
    determining the tooth color by means of the weighted summation according to the weight of each standard color value.

8. The oral cavity examination method according to claim 2, wherein the dental calculus comparison threshold comprises at least two groups of threshold intervals each comprising a high threshold and a low threshold, or the gingivitis comparison threshold comprises at least two groups of threshold intervals each comprising a high threshold and a low threshold.

9. The oral cavity examination method according to claim 8, wherein the low threshold is lower than the high threshold, and the low threshold and the high threshold of the gingivitis comparison threshold are selected from the following interval: np.array([0, 80, 12]) to np.array([40, 235, 210]), or the low threshold and the high threshold of the dental calculus comparison threshold are selected from the following interval: np.array([0, 30, 10]) to np.array([190, 255, 70]).

10. An oral cavity examination device, wherein the oral cavity examination device comprises:
    a camera device configured to acquire an oral cavity image;
    an image processing device configured to perform median filtering, gray-scale image conversion and adaptive threshold segmentation operations on the image to obtain a first intermediate image, and convert the first intermediate image from an RGB color space to an HSV color space to obtain a second intermediate image;
    a threshold determination device configured to determine a comparison threshold based on a tooth color; and
    a pixel ratio determination device configured to determine a ratio of pixels within the comparison threshold to pixels of the second intermediate image based on the second intermediate image and the comparison threshold.

11. The oral cavity examination device according to claim 10, wherein the first intermediate image comprises a tooth region in the image, the comparison threshold comprises a dental calculus comparison threshold, and the step of determining a ratio of pixels within the comparison threshold to pixels of the second intermediate image based on the second intermediate image and the comparison threshold further comprises:

determining a ratio of pixels within the dental calculus comparison threshold to pixels of the second intermediate image based on the second intermediate image and the dental calculus comparison threshold.

12. The oral cavity examination device according to claim 10, wherein the first intermediate image comprises a gingiva region in the image, the comparison threshold comprises a gingivitis comparison threshold, and the step of determining a ratio of pixels within the comparison threshold to pixels of the second intermediate image based on the second intermediate image and the comparison threshold further comprises:

determining a ratio of pixels within the gingivitis comparison threshold to pixels of the second intermediate image based on the second intermediate image and the gingivitis comparison threshold.

13. The oral cavity examination device according to claim 10, wherein the image processing device is configured to adjust the contrast of the oral cavity image.

14. The oral cavity examination device according to claim 10, wherein the tooth color is determined according to the following method:

acquiring an oral cavity image;
    performing median filtering, gray-scale image conversion and adaptive threshold segmentation operations on the image to obtain a first intermediate image;
    converting the first intermediate image from an RGB color space to an LAB color space to obtain a third intermediate image;
    comparing pixels in the third intermediate image with a standard color; and
    determining the tooth color according to a comparison result.

15. The oral cavity examination device according to claim 14, wherein the standard color comprises the following six standard color values:

RGBColor0=sRGBColor(255,255,255);
    RGBColor1=sRGBColor(164,192,239);
    RGBColor2=sRGBColor(131,172,217);
    RGBColor3=sRGBColor(124,149,205);
    RGBColor4=sRGBColor(21,46,110); and
    RGBColor5=sRGBColor(255,255,0).

16. The oral cavity examination device according to claim 15, wherein the step of determining the tooth color according to a comparison result further comprises:

determining the tooth color by means of the weighted summation according to the weight of each standard color value.

17. The oral cavity examination device according to claim 11, wherein the dental calculus comparison threshold comprises at least two groups of threshold intervals each comprising a high threshold and a low threshold, or the gingivitis comparison threshold comprises at least two groups of threshold intervals each comprising a high threshold and a low threshold.

18. The oral cavity examination method according to claim 17, wherein the low threshold is lower than the high threshold, and the low threshold and the high threshold of the gingivitis comparison threshold are selected from the following interval: np.array([0, 80, 12]) to np.array([40, 235, 210]), or the low threshold and the high threshold of the dental calculus comparison threshold are selected from the following interval: np.array([0, 30, 10]) to np.array([190, 255, 70]).

19. A tangible non-transitory computer-readable medium storing instructions for performing an oral cavity examination method, wherein the instructions, when being executed, cause a processor of a computer to at least:

acquire an oral cavity image;
    perform median filtering, gray-scale image conversion and adaptive threshold segmentation operations on the image to obtain a first intermediate image;
    convert the first intermediate image from an RGB color space to an HSV color space to obtain a second intermediate image;
    determine a comparison threshold based on a tooth color; and
    determine a ratio of pixels within the comparison threshold to pixels of the second intermediate image based on the second intermediate image and the comparison threshold.

20. The tangible non-transitory computer-readable medium according to claim 19, wherein the first intermediate image comprises a tooth region in the image, the comparison threshold comprises a dental calculus comparison threshold, and the step of determining a ratio of pixels within the comparison threshold to pixels of the second intermediate image based on the second intermediate image and the comparison threshold further comprises:

determining a ratio of pixels within the dental calculus comparison threshold to pixels of the second intermediate image based on the second intermediate image and the dental calculus comparison threshold.

21. The tangible non-transitory computer-readable medium according to claim 19, wherein the first intermediate image comprises a gingiva region in the image, the comparison threshold comprises a gingivitis comparison threshold, and the step of determining a ratio of pixels within the comparison threshold to pixels of the second intermediate image based on the second intermediate image and the comparison threshold further comprises:

determining a ratio of pixels within the gingivitis comparison threshold to pixels of the second intermediate image based on the second intermediate image and the gingivitis comparison threshold.

22. The tangible non-transitory computer-readable medium according to claim 19, wherein the instructions, when being executed, further cause the processor of the computer to at least:

adjust the contrast of the oral cavity image.

23. The tangible non-transitory computer-readable medium according to claim 19, wherein the tooth color is determined according to the following method:

acquiring an oral cavity image;
    performing median filtering, gray-scale image conversion and adaptive threshold segmentation operations on the image to obtain a first intermediate image;
    converting the first intermediate image from an RGB color space to an LAB color space to obtain a third intermediate image;
    comparing pixels in the third intermediate image with a standard color; and
    determining the tooth color according to a comparison result.

24. The tangible non-transitory computer-readable medium according to claim 23, wherein the standard color comprises the following six standard color values:

RGBColor0=sRGBColor(255,255,255);

RGBColor1=sRGBColor(164,192,239);
RGBColor2=sRGBColor(131,172,217);
RGBColor3=sRGBColor(124,149,205);
RGBColor4=sRGBColor(21,46,110); and
RGBColor5=sRGBColor(255,255,0).

25. The tangible non-transitory computer-readable medium according to claim 24, wherein the step of determining the tooth color according to a comparison result further comprises:
  determining the tooth color by means of the weighted summation according to the weight of each standard color value.

26. The tangible non-transitory computer-readable medium according to claim 20, wherein the dental calculus comparison threshold comprises at least two groups of threshold intervals each comprising a high threshold and a low threshold, or the gingivitis comparison threshold comprises at least two groups of threshold intervals each comprising a high threshold and a low threshold.

27. The tangible non-transitory computer-readable medium according to claim 26, wherein the low threshold is lower than the high threshold, and the low threshold and the high threshold of the gingivitis comparison threshold are selected from the following interval: np.array([0, 80, 12]) to np.array([40, 235, 210]), or the low threshold and the high threshold of the dental calculus comparison threshold are selected from the following interval: np.array([0, 30, 10]) to np.array([190, 255, 70]).

* * * * *